Figure 5:
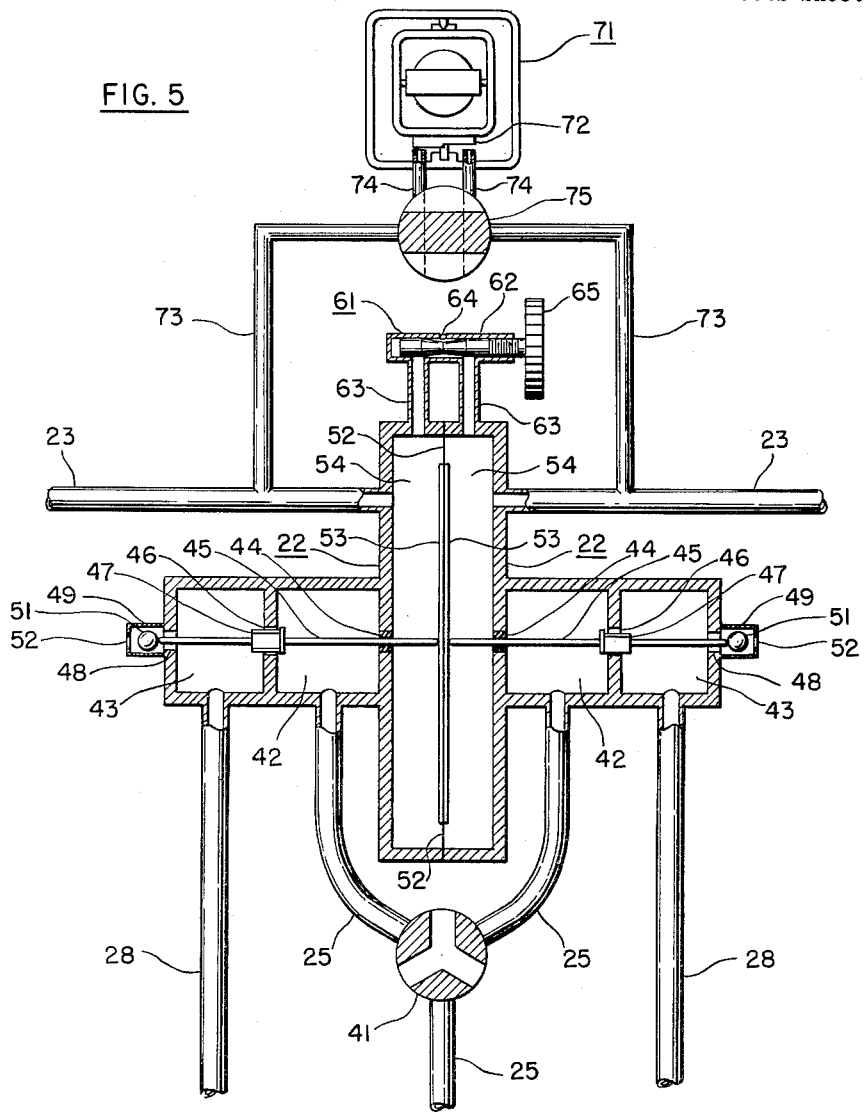

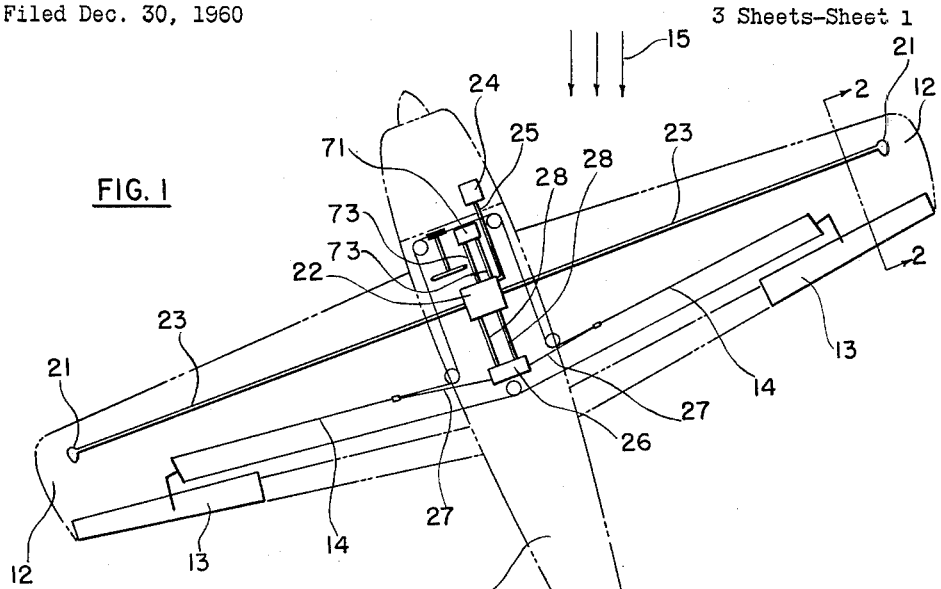
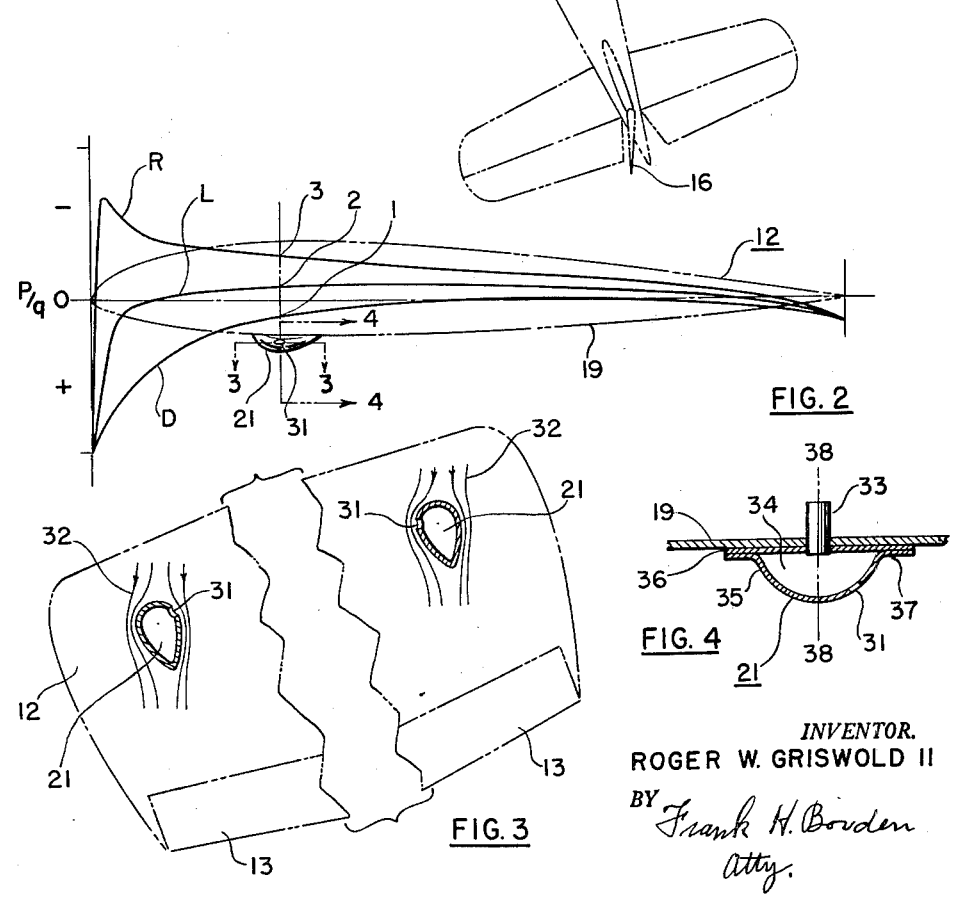

March 27, 1962  R. W. GRISWOLD II  3,027,121
AERODYNAMIC AUTOPILOT
Filed Dec. 30, 1960  3 Sheets-Sheet 2

INVENTOR.
ROGER W. GRISWOLD II
BY Frank H. Borden
Atty.

March 27, 1962  R. W. GRISWOLD II  3,027,121
AERODYNAMIC AUTOPILOT

Filed Dec. 30, 1960  3 Sheets-Sheet 3

INVENTOR.
ROGER W. GRISWOLD II
BY Frank H. Borden
atty.

United States Patent Office 3,027,121
Patented Mar. 27, 1962

3,027,121
AERODYNAMIC AUTOPILOT
Roger W. Griswold II, Old Lyme, Conn.
Filed Dec. 30, 1960, Ser. No. 79,663
18 Claims. (Cl. 244—78)

This invention relates to a natural stability type of autopilot, wherein the stability derives from an aerodynamic signal system for sensing compatibly both rate-of-turn and rate-of-roll in fixed-wing aircraft, and to co-ordination-coupling of these yawing/rolling signals so as to provide inherent damping in a self-contained system, and particularly to a unique aerodynamic sensor configuration which effectively nulls the sideslip signals yet augments the rolling/yawing signals and is coincidentally unaffected by rain, the system further including signal line bleed means to provide lateral trim and turn control, and alternatively may also include for selective operation heading lock overriding signal means from any desired absolute direction reference source such as a directional gyro having suitable pneumatic pick-off therefrom for biasing the aerodynamic signals within pre-selected limits.

Applicant's copending application Serial No. 513,020, filed June 3, 1955, on "Inherent Spiral Stability Systems," disclosed complemental aerodynamic sensor means, hereinafter generically referred to simply as orifices, mounted adjacent the respective wing tips of fixed-wing aircraft and responsive to the differential pressures developed at the orifices by the rolling, yawing and sideslip velocities of the aircraft, amplification means, servo means effective to operate the aileron controls of the aircraft, and suitable interconnections between such means whereby the over-all autocontrol system is effective to maintain automatically a generally wings-level attitude when the aircraft is operated controls-free. This simplified type of automatic control was further unique in that the signal air was also used as the actuator air. Thus the power source for the system was likewise aerodynamic, except as amplified by the centrifugal force effects with the preferred signal configuration which was productive of flight-induced negative pressures in orifices that were effectively interconnected pneumatically. The chief contribution of that invention comprised means to achieve what was termed a compatible signal system wherein the roll signals augment the roll-damping of the aircraft and cooperate with the yawing signals in effecting wings-level flight. This provided a great advance over the aerodynamic signal systems of the prior art wherein the rolling signals are incompatible with the yawing signals since they increment rather than damp, rolling of the aircraft, with resultant inherent hunting oscillations of large amplitude with auto-pilots utilizing such signal systems.

The instant invention contributes a number of important improvements to applicant's original spiral stability invention, at least three of which are in fact essential for optimum practically, namely, as follows:

(1) What is herein termed coordination-coupling of the rolling and yawing signals, as is predetermined, rather precisely, by the correct chordwise location of the orifice on the lower surface of the wing, generally within chordwise limits in typical single engine aircraft and somewhere between the quarter and third chord point aft of the leading edge functional with the roll-out rate for a given autopilot-aircraft instalation which thus determines the magnitude of the roll-damping signal. And since this opposition rolling signal is of opposite sign during roll-out, it will obviously predominate over the wings-level-restoring yawing signal at some point in the roll-out maneuver. Thus there is an anticipatory signal reversal or switch-over from yawing to rolling signal predominance sufficiently in advance of return to wings level so that, with perfect phasing thereof, as taught by the instant invention, the autopilot neutralizes the controls and even applies opposite aileron in time to effect dead-beat roll-outs of the aircraft to normal straight flight, without over-banking or underbanking in smooth air, and consequently without any incipient hunting proclivities. As noted, this highly significant result depends from the chordwise location of the orifice which is functional with particular roll-out rates;

(2) This invention further provides unique orifice configurations which are effective to substantially null the destabilizing sideslip signals and yet concomitantly augment the stability-augmentation yawing and rolling signals, thereby minimizing trim changes for various flight operating configurations of the aircraft;

(3) Not only does the preferred type of orifice optimize nulling of the unwanted sideslip signals, but it also provides the additional and very advantageous function of being effectively rain-proof, i.e., flight in even the heaviest tropical downpours does not result in spurious signals with associated unacceptable trim changes.

The structures to effect the foregoing three new basic functions are subsequently set forth in detail. Incidentally, a sideslip is herein identified as a skid or a slip involving yawed-flight deviation from otherwise coordinated turning or straight flight, wherein the longitudinal axis of the aircraft is skewed or misaligned with the flight path, in sharp contradistinction to the yawing maneuver incident to coordinated turns which involve relative rotation about the aircraft's vertical axis and wherein its longitudinal axis is tangential to the flight path and instantaneously aligned therewith.

Further, this invention adds as an optional additive system, an absolute direction reference signal biasing system for long-term heading control. This function could obviously be supplied by a simple but well damped magnetic compass suitably modified to bleed ambient air into the aerodynamic signal system, preferably proportional to heading deviation. The instant disclosure shows directional gyro means as modified for such heading lock purpose, since that comprises the presently developed additive system. Also manually-operable signal bleed means are provided for selective trim and turn control which functions are likewise a practical autopilot necessity.

Finally, this invention achieves an order of miniaturization by providing a high vacuum power source for the autopilot system, separate from the signal air as originally used. Ordinarily, this is done by using the engine vacuum pump air supply, or when such equipment is not available, an external veturi is used for the same purpose. In any case, the stability derives from aerodynamic or natural means, rather than by artificial stability gyro devices.

It is among the objects of this invention to provide in an aerodynamic autopilot system; wing tip orifices in which the signals are compatible, i.e. the rolling and yawing signals are of like sign rolling into a turn but opposite in sign during the roll-out maneuver, and in which coordination-coupling of such signals is functional with the chordwise location of the orifices, whereby anticipatory switch-over from the yawing to the roll-damping signals effects dead-beat roll-outs of the aircraft to the wings-level straight-flight attitude; wherein the orifices augment the useful rolling/yawing signals but substantially null the unwanted sideslip signals due to the respective wing tip angle-of-attack differentials resultant from yawed-flight, ball-off-center or crossed-control conditions of the aircraft, thus minimizing destabilizing trim effects incident to any combination of power and speed changes; in which no consequential signals are induced in the orifices due to rain; wherein the signal system includes ambient air bleed means to provide selective trim and turn control effects; wherein an additive heading lock system is effective to bias the aerodynamic signals functional with relatively absolute directional deviation signals from a suitably modified compass, radio signals or the like; and a pneumatic amplifier valve of relatively high sensitivity and simple, rugged, economical design; and for other objects and advantages as will become more apparent as the description proceeds.

Figure 6:
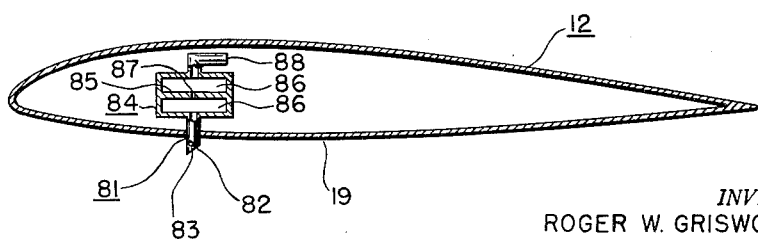

In the accompanying drawings:

FIG. 1 shows a plan view from above of a solid-line schematic presentation of the aerodynamic signal system of the invention together with typical related autopilot components as operatively applied to the lateral control system of an aircraft, the latter being shown mostly by phantom lines and wherein the controls are crossed by the application of left rudder and right aileron with resultant yawed-forward right wing and yawed-aft left wing;

FIG. 2 indicates in phantom an airfoil section as taken on line 2—2 of FIG. 1 looking outboard, and shows in solid lines a typical bulbous streamlined suction type of orifice configuration constructed according to the principles of the invention and wherein its bulbous portion projects below the lower surface of the wing with its aperture asymmetrically disposed on the inboard orifice face adjacent the 25% chord point of the wing, and superimposed upon the airfoil section are several solid-line curves indicating the relative pressure distribution over the lower surface thereof, with particular reference to the orifice station, for the corresponding angles-of-attack which are illustrative of the lower pressural changes induced upon a dropping wing and upon a rising wing by the rolling velocities of the aircraft that are imposed both voluntarily or involuntarily by turbulence, as shown by the lower and upper curves respectively, and which indicate that the magnitude of such order of rolling-velocity pressure differentials between orifices at the respective wing tips is a function primarily of the orifice chordwise location, for a given configuration and rate-of-roll or gust velocities;

FIG. 3 shows in solid lines longitudinal sectional views through the lateral plane at the apertures of the FIG. 1 complemental orifice assemblies as taken on line 3—3 of FIG. 2 looking down through the wing, together with the local flow streamlines thereover for the case when the aircraft is in a right sideslip as indicated by FIG. 1, and further indicates the nulled sideslip function of the inboard-biased apertures in substantially counteracting the adjacent local flow velocity/pressural changes which are due to the sideslip and wing tip vortex velocity differentials that are imposed over the lower surface by the lateral angle-of-attack changes between the yawed-forward and the yawed-aft wing tips, with the latter shown by phantom lines, not to scale;

FIG. 4 shows a cross sectional view through the transverse vertical plane at the aperture of the right wing streamlined orifice configuration of the previous figures, taken on line 4—4 of FIG. 2 looking aft, and shows the lead-in tube or port for connecting up the signal line within the wing, an orifice plenum chamber projecting below the lower surface of the wing which permits alternative installation therein of screens, filters, heater elements and the like, for inhibiting ingestion of foreign matter and to provide anti-icing control, respectively, and shows the flush biased aperture so disposed in the inboard face of the orifice bulb within the preferred normally-negative pressure region thereof as to be responsive to the desired yawing and rolling velocities but effective to substantially nullify the unwanted sideslip signals without noticeably affecting the former—all of which structure and attendant functions, as above and previously recited, have been established by extensive flight investigations as prerequesite, in principle, for optimizing the inherent spiral stability signal system;

FIG. 5 shows schematic details of a typical amplifier valve and related controls therefor, including lateral trim means and also an optional directional gyro component as modified with heading lock pneumatic pick-off signal means which may be superimposed upon the basic stability augmentation system for biasing the aerodynamic signals thereof in an absolute direction sense (within precessional limits of such gyro instruments) which combination system is similar to that indicated in the FIG. 1 type of autopilot configuration;

FIG. 6 shows an alternative type of tubular orifice projecting moderately below the wing and generally normal to its lower surface, wherein the orifice has an aft-biased main aperture to provide the desired flight-induced relative negative pressures plus a smaller auxiliary bleed aperture asymmetrically disposed in the inboard face of the orifice so as to superimpose anti-sideslip signal effects upon the resultant pressures sensed by such orifices, and further incorporates a signal attenuation chamber to provide what is sometimes referred to as acoustical tuning of certain undesired signal effects, this airfoil sectional view similarly to that of FIG. 2, likewise looking outboard toward the wing tip as on line 2—2 of FIG. 1.

Figure 7:
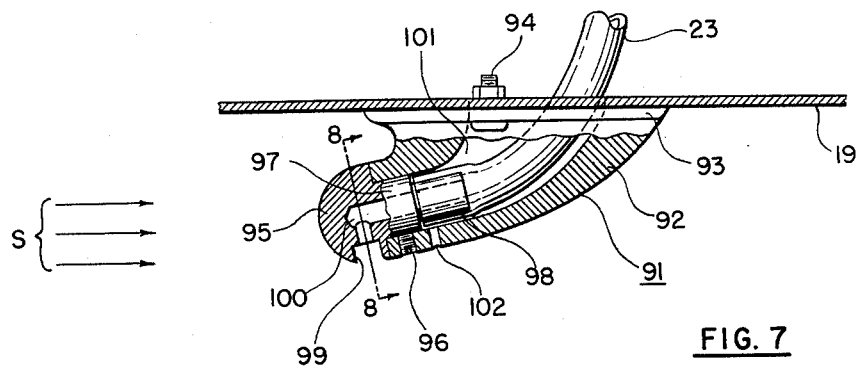

FIG. 7 shows mostly in cross sectional view of the vertical plane through the longitudinal axis, the preferred streamline type of orifice configuration constructed according to the principles of the invention, wherein the orifice longitudinal axis is canted downwardly and forwardly into the local flow over the lower surface of the wing and at an acute angle relative thereto, and the relatively fixed afterbody portion provides appreciable displacement of the pivotally mounted bulbous nose portion from the wing lower surface whereby the water runback thereover in rain storms by-passes completely the exposed aperture of the orifice assembly, and the aperture comprises a relatively wide slot generally disposed in the lower region of the bulbous nose portion and proximate to the maximum local flow velocity thereover whereby any residual water droplets effectively by-pass the inner aperture at the base of the slot without contaminating the orifice signals, and the nose portion is secured in any desired position of bias of the orifice transverse axis by suitable locking means.

Figure 8:
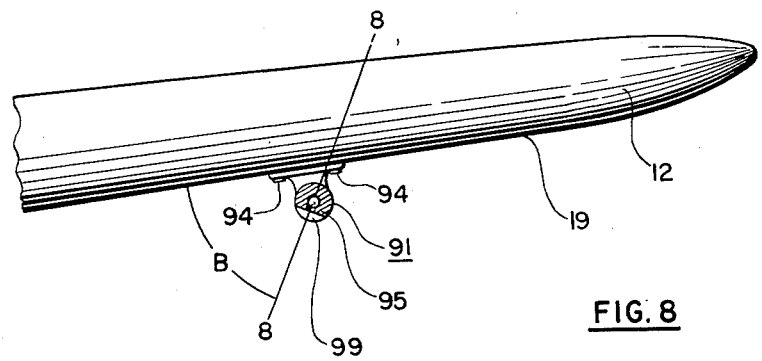

FIG. 8 shows a front elevation view of the FIG. 7 orifice on the lower surface of a wing in the tip region thereof and disposed at least one third of the wing chord inboard from the tip, wherein the nose portion is shown in cross section through the transverse axis of the orifice slotted-aperture in the plane passing through line 8—8 of FIG. 7, and the nose portion has been rotated so as to toe-in the orifice transverse axis at an acute angle relative to the wing lower surface on the inboard side of the orifice whereby any sideslip signals of the aircraft are effectively nulled as a function of the universal angular bias of the orifice transverse axis.

Referring again to FIG. 1, the phantom-line airplane 11, has respective wing tip sections 12—12 on the lower surfaces of which are mounted complemental aerodynamic sensor orifices 21—21 disposed at about ⅓ to ½ of the section 12 chord inboard from the tips thereof and proximate to the 25% chordwise station of section 12 dependent upon the roll-out rates achieved in particular installations, amplifier valve 22 communicating through aerodynamic signal tubes 23—23 with orifices 21—21 and through servo tubes 28—28 with actuating servo 26 and through power supply tube 25 with vacuum pump 24 which may be either the engine-driven or the aerodynamically-energized venturi type. Servo 26 through interconnect cables 27—27 operatively engages aileron cables 14—14 which through typical and well known bellcranks, control wheel, pulleys, etc., actuate ailerons 13—13. Amplifier valve 22 may likewise communicate through heading lock signal tubes 73—73 with modified directional gyro 71, to be described. Ailerons 13—13 are displaced for right bank while rudder 16 is displaced to the left to give a crossed-control yawed-flight right sideslip or skid, as indicated by the relative freestream flow at 15.

From the foregoing schematic depiction of the aerodynamic signal system of the invention in particular, it will be clear that the yawing signals which are proportional to the difference in tip velocities and corresponding pressures at the orifices, in a steady-state turn (as was established by the prior application) are: first, a function of maximum spanwise spacing of the orifices which, however, must still be kept essentially clear of the wing tip vortices; secondly, with a flight-induced negative pressure all-pneumatic signal system the aerodynamic differentials are compounded by the centrifugal force effects as previously described; and thirdly, the signal strength can be further appreciably augmented to provide a steeper slope thereof, by locally accelerating the flow with a protruding or streamline bulbous orifice configuration, to be described. It has been shown that these yawing velocity pressure differentials are proportional to bank angle and therefore to rate-of-turn, thus comprising a pressural index thereof or turn-rate signal which could alternatively be fed into a simple aerodynamically-responsive and non-gyroscopic turn indicator instrument, if desired, either supplemental to or independently of the autopilot configuration schematically indicated by FIG. 1 (as was disclosed by FIG. 4 in application Ser. No. 513,020).

FIG. 2 illustrates generally the preferred chordwise location of orifice assembly 21, more specifically its aperture 31, juxtaposed to lower surface 19 of wing tip 12. This figure further shows the effects upon the normal wings-level pressure distribution over lower surface 19 as indicated by the middle wings-level curve L, for an assumed constant flight speed, when a wing drops (voluntarily or involuntarily) whereby the pressure increases to that of curve D, and when a wing rises with the resultant decreased (greater negative) pressure indicated by curve R. Such pressural changes over the lower surface are due to the correspondingly increased and decreased angles-of-attack (resulting in curves D and R, respectively) which are imposed by the wing tip rolling velocities. While any such differentials in respective wing tip incidence may only amount to a few degrees even with a fast roll rate, nevertheless, the resultant rolling velocity pressural changes at the aperture station, as indicated by points 1, 2 and 3, can be substantially greater than the previously discussed yawing velocity signals. Obviously the differential between pressure points 1 and 3 (i.e. between the respective orifice total pressures) comprises the rolling velocity signal, the particular values shown by FIG. 2 having been selected purely for illustrative purposes. It should further be pointed out that these pressure distribution curves do not give effect, for purposes of clarity, to the appreciable negative pressure humps in all of them which would be induced by the accelerated local flow over the orifice bulb, thus precipitating a considerably steeper slope to both the yawing velocity and the rolling velocity signal curves. The $P/q$ ordinate of FIG. 2 relates to the classic aerodynamic method of giving the relative pressures P in terms of freestream dynamic pressure $q$.

It will be clear that the rolling signal comprises a measure of the aircraft's rate-of-roll since with high roll rates, points 1 and 3 will be correspondingly displaced further apart, and vice versa. Further, that if the orifice is moved toward the trailing edge of the wing, the roll signal for a given roll rate will become weaker, while a more forward orifice location will rapidly augment the roll signal. Since the rolling velocity and its attendant opposition or roll-damping signal ordinarily tends to remain more or less constant throughout most of the roll-out maneuver, due to the rolling inertia of the aircraft, while the restoring or roll-out yawing signal is getting progressively weaker with diminishing bank angle and turn rate, there inevitably comes a point prior to the wings level attitude, with correct orifice location, whereas the roll-damping signal becomes predominant over the fading-out yawing signal of opposite sign, thus causing reversal of the resultant signal. This means that aileron control anticipation is available inherently in such a signal system. It accordingly follows that there is a precise chordwise orifice location which is essentially critical for each given orifice-wing combination and roll rate in a particular type of aircraft, which will be effective potentially to give dead-beat roll-outs. This is due to the fact that with an autocontrol device responsive to such a coordination-coupled signal system, the aileron response will be phased progressively with the above described signal reversal so as to first neutralize and then even apply opposite aileron prior to return to wings level, such control anticipation leading the roll-out maneuver sufficiently so that straight flight is resumed, without overbanking, underbanking, or hunting proclivities, within practical design limits. Such anticipatory signal phasing is herein termed co-ordination-coupling of the rolling/yawing signals.

FIG. 3 comprises enlarged sectional views in the lateral/longitudinal plane through apertures 31—31 of orifice sensors 21—21 and shows the considerable inboard bias of the apertures, as is also shown by FIGS. 2 and 4. A two-dimensional section of the local flow streamlines 32—32 over the respective orifices 21—21, is also shown for the sideslip condition depicted by FIG. 1. In this case, the yawed-forward right wing will be at relatively increased angle-of-attack and the velocity of the local flow over the lower surface thereof will be reduced accordingly with consequent increased pressure, likewise as generally indicated by curve D of FIG. 2. Similarly, the yawed-aft left wing will have reduced incidence, increased local velocity and reduced pressure over the lower surface thereof, also more or less as indicated by curve R of FIG. 2. Both of these yawed-flight local flow velocity/pressural effects over the lower surface, will be further augmented differentially by the sideslip-induced changes in the respective wing tip vortices, i.e. the right-hand tip vortex will be inhibited and the left-hand one augmented, in this case. Similarly to the rolling velocity signals, these sideslip-induced angle-of-attack changes likewise introduce roll signals, as noted. The latter definitely constitute unwanted signals since the yawed-flight or crossed-control situation varies according to the operating speed and power setting of the aircraft. This means that constant trimming-out of these sideslip signals, by the FIG. 5 trim valve device to be described, will be required in order to maintain straight flight under changing power and speed operating conditions, unless such signals are otherwise effectively nulled.

As will be seen from FIG. 3, the inboard bias of the orifice apertures is such that the decelerated flow over the lower surface of the yawed-forward right-hand wing tip is locally accelerated over that aperture by the orifice bulb, while the left-hand yawed-aft aperture is brought towards a stagnation pressure region on that orifice so as to offset the adjacent accelerated flow. The net effect of these localized velocity/pressure reversals of the yawed-flight phenomena, as achieved by this unique biased-aperture orifice configuration and as is readily controlled by the asymmetry of its aperture, is thus to substantially cancel out, for all practical purposes, any such sideslip signals. Thus this anti- or nulled-sideslip type of orifice becomes virtually insensitive to both the involuntary skids and slips encountered in rough air, as well as to any crossed-control situation imposed by the pilot or by turbulence or those resulting from lack of proper trim means in the aircraft. Effectively so nulling the sideslip velocity/pressure differentials, accordingly avoids any objectionable trim changes which might otherwise occur, power-on and power-off, throughout the speed range of the aircraft.

It should further be pointed out that certain particular aspects of the foregoing discussion relate specifically to the negative pressure type of orifices as applied to wings of positive dihedral wherein the degree of inboard aperture bias is generally proportional to such dihedral angle, i.e. the bias decreases as the wing dihedral is reduced. It will be apparent that the sideslip signals will be much more pronounced in wings of high dihedral, as in unswept low-wing aircraft, due to the resultant correspondingly greater relative change in incidence between the yawed-forward and the yawed-aft wing tips, in comparison with wings of low dihedral angle, as in unswept high-wing aircraft. This means that the controlling sideslip parameters are such that for the case of the highly swept-wing aircraft which have anhedral (or negative dihedral) wings, the preferred suction type of orifice would, in such applications, have its aperture biased suitably outboard so as to achieve the same sort of nulled sideslip signal effects as herein specified. In certain wing-orifice organizations, it will be understood that neither inboard nor outboard aperture bias will be required to provide acceptable nulled sideslip effects, due to effectively zero wing dihedral generally as affected by wing sweep as well as by the actual geometric dihedral.

FIG. 4 shows a transverse cross sectional view through the aperture of the semi-bulb type of orifice configuration taken on line 4—4 of FIG. 2 looking aft. Orifice 21 is comprised of lower streamlined bulb 35 which is fixedly attached by suitable sealing means to upper plate 36, which together form internal plenum chamber 34 and external mounting flange 37 having the requisite mounting holes (not shown) for attachment of the orifice assembly to the lower surface 19 of the wing, in the appropriate location as previously specified. Upper plate 36 mounts, by permanent sealed means, connecting tube or port 33 which projects within the wing for attachment of signal line 23 thereto. Bulb 35 is pierced by the aperture 31 within a region of local-flow-induced and normally negative pressure thereon. Aperture 31 is asymmetrically disposed relative to the orifice vertical plane of symmetry 38—38 to provide appreciable inboard bias of aperture 31 when mounted on the lower surface 19 of the wing, and as previously recited, the degree of bias depends primarily upon the wing dihedral angle. Accordingly, complemental orifices 21—21 become right and left assemblies for any given aircraft application. It will be understood that this semi-bulb orifice configuration could alternatively comprise a full streamlined body of revolution, likewise similarly juxtaposed relative to the wing to achieve similar functions.

FIG. 5 depicts essential details of amplifier valve 22 comprised of signal chambers 54—54 communicating with signal tubes 23—23, flexible diaphragm 52—52 to which is attached rigid diaphragm plates 53—53 which sub-assembly establishes pneumatic separation of the respective signal chambers 54—54 but permits moderate sidewise diaphragm movement in response to the flight-induced differential pressures in chambers 54—54 which are imposed by the previously described signal system. Vacuum power supply tube 25 enters servo on/off valve 41 and delivers therefrom through branched lines 25—25 into respective servo supply chambers 42—42 which communicate through suction ports 46—46 with servo delivery chambers 43—43 which in turn communicate with servo tubes 28—28 to deliver vacuum power or ambient pressure feedback as the case may be to the servo 26 (not shown by this figure). Poppet shafts 45—45 operatively contact diaphragm plates 53—53 without physical attachment thereto and are slidably carried by inboard bearings 44—44 and outboard bearing-poppet units 47—47 mounted thereon, and in neutral, shafts 45—45 extend slightly through ambient pressure feedback ports 48—48 in delivery chambers 43—43 which latter mount ball retainer cups 49—49 having vents therein 52—52 and enclosing loosely feedback closure balls 51—51 which are relatively larger than feedback ports 48—48.

From the foregoing description and the diagrammatic sketch of FIG. 5, it will be seen that when the diaphragm assembly moves to the left, for instance, due to higher suction in left-hand signal line 23, as occurs in a right turn or when the right wing drops, the right-hand poppet assembly will move to the left under the influence of the suction forces on it, thus opening suction port 46 and progressively closing feedback port 48 on the right side as ball 51 seats therein, again due to suction. The left-hand poppet assembly will concurrently be forced to the left by the adjacent diaphragm plate 53, thus closing suction port 46 and opening wider feedback port 48 on the left side, whereby right-hand servo tube 28 then communicates with vacuum pump 24 (not herein shown) while left-hand servo tube 28 delivers feedback air under ambient pressure.

Continuing with FIG. 5, trim valve assembly 61 contains double-tapered needle 62 screw-mounted therein, ambient pressure bleed hole 64, connecting tubes 63—63 communicating with signal chambers 54—54, and trim knob 65, whereby turning the latter so as to screw-in needle 62 will effectively bleed the left signal line 23 to cause corresponding moderate loss of the flight-induced negative pressure therein which is equivalent to imparting a right signal to the system, as in a left turn, with resultant right turn or trim, as desired. Conversely, left trim or turns are accomplished by screwing-out needle 62 so as to bleed right hand signal chamber 54. The screw threads in trim valve assembly 61 are selected as to right or left-hand threads, so that this control hook-up provides natural-sense functions whereby the aircraft turns in the same direction as the trim knob was turned. Illustratively in the FIG. 5 configuration herein disclosed, right-hand screw threads would be used.

FIG. 5 also illustratively shows modified directional gyro (D—G) 71, which, alternatively can comprise a simple magnetic compass or other directional sensing device, mounting stepped cam plate 72 on the gimbal ring thereof, and relatively fixed to the gyro case and adjustably juxtaposed close to the cam plate are pneumatic pick-off nozzles 74—74 which lead into D—G on/off valve 75 which in turn operatively delivers directional signals through connecting tubes 73—73 to the aerodynamic signal tubes 23—23, so as to bias the latter signals correspondingly. The respective parts are so related that when the cam plate step is aligned symmetrically with the nozzles, the conventional D—G compass card (not shown) reads zero. The operation of such means to bias the aerodynamic signal system of the invention to provide the so-called heading lock function, is very simple in principle.

When nozzles 74—74 are symmetrically disposed relative to the step of cam plate 72, no signal results and the heading will be maintained, within the D—G precessional limits, but if turbulence or some other disturbance puts the airplane off course the gyro and aerodynamic signals then cooperate to restore the original heading. When the compass card is offset from zero, thus misaligning cam and nozzles, then the nozzle which stands furthest off the cam plate pulls the higher suction, with resultant signal differential which unbalances accordingly the aerodynamic signals that, until then, had been zero, assuming smooth air and resultant straight-flight conditions prevailed. The airplane will then go into a turn which the aerodynamic signals will oppose, with consequent new balance of these combination signals thus being achieved in a stabilized angle of bank and resultant turn rate which was preselected in the first place by suitable adjustment of the nozzle spacing off the cam plate and by the effective sizing of the nozzle orifices. The D—G mechanically-controlled signal strength is thus matched to that of the aerodynamic signal system to provide any desired rate-of-turn by means of this supplemental heading lock system. The airplane obviously comes out of this D—G imposed turn when cam plate 72 is again aligned with nozzles 74—74 and the heading lock signals synchronously fade to zero. In practice then with valve 75 shut off, the pilot would first direct the aircraft onto the desired course, allowing suitably for drift so as to establish the correct heading, then set his D—G on zero heading and lastly engage on/off valve 75. If he subsequently wants to turn to the right or left, he merely resets his directional gyro in the correct turning sense and by the number of degrees of heading change that is desired.

The foregoing paragraph describes the bare essentials whereby the simple aerodynamic spiral stability augmentation system becomes a single-axis autopilot having directional reference overriding signal means. The preferred embodiment of this particular type of supplemental building-block device for long-term directional control, would include means to rotate nozzle assembly 74—74 through full 360° azimuth in either direction, a heading selector secondary compass card attached thereto, and needle valves communicating with each nozzle 74—74 to permit adjustment in flight of the D—G signal sensitivity and thus to selectively vary the heading-lock-controlled turn rates, as may be desired by different pilots. With this more sophisticated device, the heading indicated by the directional gyro would be maintained in essential agreement with the aircraft's magnetic compass, as in current practice with a standard D—G instrument, and when operating under heading lock control the reading of the secondary heading selector compass card would also agree with the other two. Turning automatically to any selected new heading, however, would be accomplished simply by changing the secondary selector card through rotation of its control knob to the desired heading and in the direction of least-angular-path thereto, same as the ensuing turn. The D—G master compass card would be changed occasionally only to correct for precessional errors, as is customarily done at present.

FIG. 6 shows an alternative type of tubular orifice 81, mounted in and projecting below lower surface 19 of wing tip section 12, and having an aft-biased main aperture 82 and an auxiliary bleed smaller aperture 83 in the inboard face thereof, to comprise a nulled-sideslip negative pressure type of orifice configuration, likewise compatibly disposed relative to the wing 12 and responsive to the favorable local flow interacting effects therebetween. Additionally and alternatively, orifice 81 mounts at its upper end and within wing 12 in this case, signal attenuation chamber 84 which is substantially divided by baffle plate 85 into plenum chambers 86—86 which respectively communicate with orifice 81 and port 88 mounted oppositely therefrom on chamber 84. Baffleplate 85 contains bleed hole 87 which ordinarily is centrally disposed therein and preferably but not limitatively in relative alignment with the tubular connections effected by orifice 81 and port 88. Bleed hole 87 is preferably but again not limitatively smaller than the inside diameters of orifice 81 and port 88. Obviously, a series of baffleplates and plenum chambers could be used alternatively, as in a Maxim silencer, for example. Further, it will be clear from consideration of FIG. 4, that a baffleplate generally similar to 85 could be incorporated within bulb 35 to so divide plenum chamber 34 into the corresponding chambers generally similar to the FIG. 6 configuration, as to provide in orifice 21 substantial attenuation of the high gust-imposed signals, in particular. Likewise, referring again to FIGURE 2, the sharp aft-biased protruding lip comprising aperture 82 essentially, could be applied to distend aperture 31 externally of bulb 35 so as to further augment the signal strength of orifice 21. Finally and alternatively to attenuation chamber 84, the function provided by the latter structure or other signal attenuation functions, may be achieved by suitable pressure relief valves, flexible diaphragms, and the like. The object is to provide what is known as acoustical tuning of the signal system. Another alternative configuration of the type 81 tubular orifice would dispense with the auxiliary bleed aperture 83 and rotate orifice 21 so that the bias of main aperture 82 would face inboard as well as aft and thereby likewise achieve the previously described nulled-sideslip signal effects.

Related to but not limitatively dependent upon signal attenuation means such as described above, the instant signal system could, either independently of or concomitantly with any applicable autocontrol device, be applied to a suitably responsive instrument calibrated to indicate whether the aircraft is rolling and at what rate and in which direction and when it is in steady-state flight. Additionally and/or alternatively, when such an instrument is coupled into the instant signal system together with an autocontrol device, it could likewise indicate the displacement from neutral directionally and quantitatively of the aileron control system in response to the signals imposed by deviations of the aircraft from a wings-level attitude. It will of course be obvious that such a rate-of-roll and control-displacement instrument could be combined with the previously specified rate-of-turn device, to provide multiple indications of these functions in the same instrument.

FIG. 7 shows the principal structural details of the preferred type of orifice assembly 91, comprising essentially a streamlined body of revolution having relatively fixed afterbody portion 92, merging into mounting plate 93 at an acute angle thereto which in turn is secured to wing lower surface 19 by attachment bolts 94 (only one herein shown), and rotatable bulbous nose portion 95 mounted concentrically with afterbody 92 by lock screw 96 therein bearing on nose plug section 97 which in turn extends into stepped port 98 onto which is mounted signal tube 23 (herein assumed to be clear plastic) which leads internally into the wing through lower surface 19. Nose portion 95 comprises a generally transverse slotted aperture 99 having a sharp-edged upstream lip as related to the local flow streamlines indicated by S, and a rounded downstream lip leading into afterbody 92. Aperture 99 leads at the base of its slot through circular and cranked orifice passage 100, into tube 23 which may, in turn, communicate with an autopilot system such as indicated by FIG. 1. As will be obvious, the transverse axis 8—8 of cranked passage 100, may be rotated to any desired angle of bias relative to the orifice vertical plane of symmetry herein illustrated by the cross sectioned areas, to effectively null the sideslip signals through universal adjustment on any aircraft installation, by the simple expedient of relieving lock screw 96 and rotating nose portion 95 to the required null-point bias angle, as is more clearly illustrated by FIG. 8, to be described. Afterbody 92 has internal chamber 101 the forward portion of which matches nose plug 97 and is purged of any moisture accumulation by drain hole 102 in the lower part of afterbody 92.

FIG. 8 gives a front elevation view of the FIG. 7 orifice 91 mounted on lower surface 19 of one wing tip section 12 (it being understood that another such orifice is similarly mounted in the other wing tip section of the aircraft) with nose portion 95 truncated in the transverse plane of orifice passage 100 on line 8—8 of FIG. 7, and wherein transverse axis 8—8 is biased inboard at acute angle B relative to lower surface 19, so as to essentially null the sideslip signal effects that would otherwise be experienced by the indicated dihedral angle of this wing. It will be understood that the FIG. 7 orifice provides the nulled-side-slipe function in similar manner to that of the FIG. 2 type, as is more fully delineated in the preceding description of FIG. 3. But obviously, the universally adjustable bias angle of the FIG. 7 orifice is a great improvement over the fixed aperture configuration of the FIG. 2 orifice which must be tailored to suit each aircraft type. In this connection, however, it is pertinent to point out that the preferred FIG. 7 type of orifice has been found by extensive flight test investigations, to be naturally insensitive in rather high degree and not at all sensitive to the undesired sideslip signal effects. For example, in most high wing aircraft installations wherein the dihedral angle is small, no bias whatever of the FIG. 7 type orifice is required since the trim changes under all conditions of power, speed and aircraft configuration, are inconsequential, for all practical purposes. And in low wing installations, the null-point bias angle is either moderate or not required at all. The reason for this fortunate result is that the wide slot transversely of aperture 99 is effective to average-out the pressure distribution thereover incident to the accelerated local flow over nose portion 95. And of course, this accelerated flow correspondingly enhances the slope of the rolling and yawing velocity signals that are sensed by the FIG. 7 orifice. Since this configuration not only augments the useful signals but also concomitantly minimizes the unwanted sideslip effects and provides universal control thereover, and additionally has been proven to have rainproof capabilities, it is considered to comprise the optimum orifice configuration, as of the instant filing date.

It will be understood that the broad scope of the instant invention comprises an aerodynamic signal system having complemental sensors responsive to flight-induced pressural changes, herein generically referred to as orifices, and having such configuration and disposition of the sensors distally relative to an aircraft wing as to provide the four signal system functions which are essential for optimized autopilot applications, in such type systems to wit: (1) compatible rolling-yawing signals, comprising the essential invention of application Serial No. 513,020, as herein used cooperatively with; (2) coordination-coupling of said signals; (3) nulled-sideslip signal effects, and; (4) a rain-proof orifice configuration. The invention is not limited to the particular means for effecting operative interconnection between such signal sensing elements, as by the pneumatic cross-over tubes 23—23 herein disclosed, nor by the mechanical interconnect means of application Ser. No. 513,020. Obviously, for example, orifices 21, 81 and 91, might comprise pressure transducers wherewith electrical communicating signal means would be used. Or tubes 23—23 might comprise hydraulic rather than pneumatic lines. Nor is this invention concerned primarily with particular types of autopilot components which may be used in conjunction with such a signal system, such as amplifier valve 22 of FIG. 5, nor with particular types of heading lock additives thereto, such as the directional gyro or other directional sensing device 71 of the same figure, so long as the requisite system components provide the recited functions.

Having described the invention, I claim:

1. In aircraft having a wing with a lower surface and spanwisely spaced complemental wing tip regions thereof, lateral control means for said aircraft and an autopilot system therefor functionally operative on said means and comprising flight-responsive and effectively communicating complemental negative pressure-sensing orifice means respectively adjacent to said regions whereby deviations of said aircraft from a wings-level attitude result in compatible differential pressure rolling and yawing signals between said complemental orifice means respectively of like sign or order rolling into a turn but opposite in sign or order during the roll-out maneuvers of said aircraft, and wherein said orifice means are predeterminedly located respectively proximate to the quarter chord point of said regions to effect coordination-coupling of said rolling and yawing signals functional with the roll-out rates for a given said aircraft and autopilot system, whereby during the roll-out maneuver the roll-damping rolling signals become predominant over the wings-level-restoring yawing signals sufficiently in advance of return to wings-level as to effect anticipatory reversal of the resultant signal functional with the respective strengths of said signals and said opposite sign thereof and said autopilot system effects substantially dead-beat roll-outs of said aircraft to said wings-level attitude.

2. In aircraft as in claim 1, wherein said autopilot system further comprises servo means, power means, amplifier means and interconnections between all of said means.

3. In aircraft as in claim 1, wherein said orifice means are progressively stepped aft of said quarter chord point relatedly with increased roll-out rates of said aircraft effected by said autopilot system.

4. In aircraft as in claim 1, in which said respective orifice means are disposed inboard in range from ⅓ to ½ of the tip chord of said wing so as to maintain optimum spanwise spacing of the respective orifice means consistent with minimal adverse effects from the wing tip vortices of said aircraft.

5. In aircraft as in claim 1, and selectively and manually operable signal bleed means for said system effective to null said signals to maintain straight-flight attitudes of said aircraft for trim control and to initially bias said signals in the right or left turn sense to maintain steady-state banked-flight attitudes of said aircraft for turn control.

6. In aircraft as in claim 1, and an additive heading lock system comprising relatively-absolute directional signal means in communication with said autopilot system selectively operable to bias the signals from said orifice means so as to provide automatic long-term heading control for said autopilot system and including heading selector control means for said additive system.

7. In aircraft as in claim 6, wherein said additive system comprises a directional gyro having pneumatic signal pickoff means for selectively and automatically biasing the aerodynamic signals from said orifice means.

8. In aircraft as in claim 1, wherein said orifice means have bulbous shape effecting local flow acceleration thereover with resultant amplification of said rolling and yawing signals.

9. In aircraft as in claim 1, wherein said autopilot system incorporates servo means operative upon said control means and interconnected amplifier means, and the latter comprises complemental signal chambers separated by flexibly mounted diaphragm means communicating respectively with said orifice means and said diaphragm means are movable in operative response to said signals in said respective chambers, valve means communicating with ambient pressure and with a vacuum power source, said valve means being operatively associated with said diaphragm means to provide differential pneumatic force in one sense or the other on said servo means in response to motion of said diaphragm means.

10. An automatic wings-leveling device for aircraft having a fixed-wing with tip regions, a lower surface and lateral control means therefor, comprising rate-of-roll and rate-of-turn pneumatic signal means including complemental suction type orifice means respectively juxtaposed proximate to said lower surface and distally in said tip regions such as to achieve favorable wing-orifice local flow interference effects with substantial avoidance of unfavorable tip vortex flow effects and effective to aerodynamically induce substantial negative pressures in said orifice means relative to the ambient or freestream static pressure, said respective negative pressures being effectively equalized in normal wings-level flight and providing operative differential signals therebetween cooperatively resultant from banked-flight attitudes of said aircraft both by the rolling velocities and by the yawing velocities thereof, amplifier means sensing said signals and including a power source productive of a control moment proportional thereto, and servo means connected to said amplifier means and to said control means, wherein said orifice means are disposed aft of the leading edge of said wing and generally proximate to the 25% chord point on said lower surface.

11. An automatic wings-leveling device for fixed-wing aircraft having lateral control means, complemental wings having spanwisely spaced lower surface regions thereof, suction orifice means respectively disposed in said regions effecting favorable wing-orifice local flow interference effects and responsive compatibly to the areodynamic pressural changes thereover induced primarily by the rolling and yawing velocities of said aircraft, amplifier means productive of a control moment, power means connected to said amplifier means, means effectively connecting said respective orifice means and said amplifier means, servo means connected to said amplifier means and to said lateral control means, wherein said orifice means include means effective to substantially null otherwise-existent sideslip pressural changes.

12. An automatic wings-leveling device as in claim 11, in which said orifice means comprise apertures respectively biased or faced relative to each other.

13. In aircraft having a wing with a lower surface and spanwisely spaced wing tip regions thereof, lateral control means for said aricraft, and an autopilot system therefor functionally operative on said means and comprising flight-responsive and effectively communicating complemental negative-pressure-sensing orifice means respectively disposed proximate to said regions and having apertures inclined away from the local flow thereover so as to substantially avoid ram impact therein while providing favorable wing-orifice pressural interference effects, amplifier means, actuator means, and connections between said means such that deviations of said aircraft from the normal wings-level straight-flight attitude result in compatible differential pressure rolling and yawing signals between said respective orifice means wherein said signals oppose wing-dropping rolling into a turn and wherein upon roll-out to said normal attitude said signals are opposed and said rolling signals effect prior to completion of the roll-out maneuver predominate control response over said yawing signals as the latter fade towards zero, whereby the initiating wings-level-restoring yawing response is effectively eliminated in anticipation of said completion by the roll-out-opposing rolling response to provide inherent correctly-phased damping for said system and the latter is effective to dynamically stabilize said aircraft in said normal attitude.

14. An automatic stability augmentation system for aircraft having a fixed wing, a lower surface thereof, and controls therefor comprising banked-flight amplifier detector means responsive compatibly to differential pressures resulting from the rolling velocity and from the yawing velocity deviations from the normal wings-level attitude of said aircraft, said amplifier detector means including complemental orifice means in said lower surface having apertures inclined away from the local flow thereover so as to avoid ram impact therein and respectively juxtaposed distally in said aircraft in proximal relation to said surface to operatively provide favorable wing-orifice pressural interference effects, pneumatic effective interconnections between said means to effect response of said amplifier detector means generally proportional to differences in said pressures, actuator means connecting said amplifier detector means and the appropriate controls of said aircraft for applying said response to effect recovery from said deviations, whereby said pressures are effectively equalized in said normal attitude and said differences are of similar order or sign, for like said roll and yaw deviations and of opposing order for opposite said roll and yaw maneuvers and wherein said pressures cooperate to provide correctly-phased restoring moments by said opposing order of differential pressures whereby roll-out recovery of said aircraft substantially terminates generally coincident with return to said normal wings-level attitude.

15. In an aircraft having fixed wings controls therefor and tip sections including lower surfaces thereof, an automatic spiral stability system responsive to inherent signals comprising pressure sensitive complemental suction orifice means respectively distally disposed proximate to said surfaces so as to operatively induce differential pressures compatibly therein arising from and proportional to the rolling and yawing velocities of said aircraft, amplifier detector means responsive to said pressures, power means and servo actuator means including connections between said means to the appropriate controls of said aircraft, whereby said system is self-sufficient in dynamically stabilizing the normal generally wings-level straight-flight attitudes of said aircraft without recourse to secondary position follow-up or feedback controls therefor and said orifice means are substantially insensitive to generally symmetrical local flow angle-of-attack changes on said tip sections.

16. An automatic stability augmentation system for aircraft operatively characterized by local flow thereover and having a wing, controls therefor and lower surface tip regions thereof, comprising aerodynamic suction-type complemental sensor means symmetrically disposed respectively in said regions and protuberant therefrom and including apertures operatively located in relative negative pressure areas of said means sensing differential pressure signals therebetween, wherein said apertures are recessed within said sensor means and spaced from said local flow thereover, whereby said signals are not affected by rain operatively encountered by said aircraft, 17. An automatic stability augmentation system as in claim 16, including power means, amplifier means and servo means therefor, control means for said wing, and interconnections between said means, whereby said pressures are essentially equalized in the normal wings-level straight-flight attitudes of said aircraft and differentially effective to apply a workable force on said control means in banked-flight attitudes of said aircraft such as to restore said normal attitudes thereof without consequential overbanking, underbanking or hunting proclivities.

18. An aircraft having a wing with spanwisely and chordwisely extent and respective lower surface tip regions thereof, wherein complemental sensor means are respectively mounted chordwisely in said regions between the quarter and third chord points on said wing taken at such sensor wing section and respectively mounted spanwisely not less than an equal distance inboard nor more than one full said chord length thereof inboard from the extreme tip of said wing, said sensor means operatively responsive to local fluid flow pressure thereover and comprising a streamline hollow body portion, a mounting plate angularly attached thereto having an access hole communicating with said hollow body and a nose piece attached to said body portion and forming therewith a completed streamline shape, wherein said nose piece contains a recessed orifice spaced from said local flow and communicating with said hollow body, and wherein said recessed orifice is so disposed relative to said local flow whereby said means sense relatively-negative pressural changes incident thereon by the rolling and yawing maneuvers of said aircraft and amplify said pressural changes concomitantly with being generally insensitive to and thereby substantially nulling any such sideslip pressural changes and said means are not affected by rain operatively encountered by said aircraft.

References Cited in the file of this patent
UNITED STATES PATENTS

| | | |
|---|---|---|
| 1,018,400 | White | Feb. 20, 1912 |
| 2,293,889 | De Florez | Aug. 25, 1942 |
| 2,364,128 | Carlson | Dec. 5, 1944 |
| 2,400,701 | Meredith | May 21, 1946 |

UNITED STATES PATENT OFFICE
CERTIFICATE OF CORRECTION

Patent No. 3,027,121    March 27, 1962

Roger W. Griswold II

It is hereby certified that error appears in the above numbered patent requiring correction and that the said Letters Patent should read as corrected below.

Column 1, line 60, after "within" insert -- 1/4" --; column 3, line 32, after "lower" insert -- surface --; column 6, line 2, for "whereas" read -- whereat --; column 10, line 69, for "-slipe" read -- -slip --.

Signed and sealed this 3rd day of July 1962.

(SEAL)
Attest:

ERNEST W. SWIDER
Attesting Officer

DAVID L. LADD
Commissioner of Patents